Patented Oct. 22, 1929

1,732,317

UNITED STATES PATENT OFFICE

EUGEN THOMA, OF PFORZHEIM, GERMANY, ASSIGNOR TO ERNST GIDEON BEK, OF PFORZHEIM, GERMANY

METHOD OF SOLDERING OF CHAIN AND RING-MESH FABRICS

No Drawing. Application filed September 4, 1924, Serial No. 735,951, and in Germany September 10, 1923.

Fine chains and ring mesh fabrics have been produced hitherto from tubular wire filled with solder, that is to say, from wire composed of a shell of metal and a core made of a suitable solder alloy. This procedure is objectionable for the reason that the manufacture of the solder filled wire is very expensive and that the finished article contains cavities resulting from the fact that some of the solder has flowed into the joints. According to another method over which the present invention constitutes an improvement, the chains or fabrics having joints to be completed by soldering are provided with an electrolytic deposit of solder. The formation of a coat of soldering metal might be effected either by depositing successively the individual metals of which the solder is composed and then applying heat to fuse them together, or by depositing all of said metals simultaneously and then applying heat to cause the solder to run into the joints. Whichever of these two methods was employed heretofore great difficulties were encountered in practice as regards obtaining a homogeneous structure of the resulting solder. Of course, the solder had to be of such a nature that the heat applied to melt such solder would not affect injuriously the metal of the article itself. Such articles were made either of precious metals such as silver, gold and their alloys or of base metals such as German silver, tombac or other copper alloys.

When the successive electrolytic deposition of the several ingredients of the solder is employed the difficulty arises that bringing the solder to the melting point will not result in a homogeneous mass or alloy and the joints will, therefore, not be so perfect as when the soldering material is absolutely or practically uniform. On the other hand when all the constituents of the solder are deposited by a single operation from the same bath or electrolyte, it has been practically impossible, heretofore, to deposit the various metals in the exact proportions desired, that is to say, in those proportions which are the best for the subsequent soldering action. If we prepare diagrams for showing by curves the characteristics of electrolytic deposition of various metals from solutions of their salts, the abscissæ representing the voltage of the current and the ordinates representing the current-density or amperage, it will be found that the relation of these curves, if drawn on the same diagram, is such that only at certain points can ordinates be drawn which will intersect two or more of these curves. It is well known that the amount of metal deposited is in direct ratio to the current-density or amperage. If the diagram shows that at a certain voltage the ordinates intersect only one of said curves, this means that under these conditions only the particular metal corresponding to that curve will be deposited. If we select an ordinate which intersects two of the curves this means that at that particular voltage the two metals whose curves are intersected will be deposited in the ratio indicated by the respective ordinate portions. This is where the difficulty arises; for it will be obvious that the very definite relative proportion of the two metals deposited by the electric current, as indicated by the diagram, will, generally speaking, not be the proportion which is best suited for soldering purposes. One of the problems which I have solved by my invention, therefore, consisted in effecting a change in the relative positions of the said curves on the diagram so that the proportions of two or more metals deposited simultaneously by the action of the electric current might be made to suit the purpose in view, that is to say, might be made such as to produce the best results in soldering. I have found that this shifting of the said curves relatively to each other may be obtained in various ways. One of these ways consists in adding to the electrolyte salts, for example, cyanide of potassium, which form complex ions with the ions of one or both of the metals to be deposited. As a second way of accomplishing the desired result I may employ as the electrolyte, a solution of the double salts of cyanide of potassium and the desired metal. The third way consists in selecting the deposited metals in such proportions that they will form so called solid solutions or chemical compounds. Still another way of varying the proportion of the metals deposited by electrolysis consists in varying the temperature of the electrolyte. It has been found that changing the temperature of the electrolyte does not shift all the curves mentioned above equally but brings the curves either closer together or farther apart and, therefore, a proper choice of the temperature of the electrolyte enables me, within certain limits, to vary the proportion in which the metals contained in the electrolyte will be deposited.

When I adopt the other mode of producing a homogeneous coating of solder, which method involves the successive deposit of the individual metals, in separate electrolytic baths, it is not sufficient to deposit the individual metals in the desired proportions and then simply bring the layers of these metals to fusion. Unless certain precautions are taken which constitute important features of my invention, the solder produced by the simple melting of these separate layers will not be sufficiently homogeneous for satisfactory practical results. I have found that a homogeneous structure of the resulting solder can be obtained by the use of temperatures below the melting point of the solder metal having the lowest melting point, such lower temperature being applied in a particular way and not simply incidentally and for a short time as it would be if, according to usual practice, the temperature was brought up quickly to the melting point. More particularly I have found that when a solder composition has been melted and is then allowed to cool slowly the intermixing of the constituents continues even when the temperature has fallen below the melting point of the solder metal having the lowest melting point, and diffusion of the metal takes place. One of the ways to produce the desired results in this mode of my invention, therefore, consists in cooling the fabric after the melting of the solder, so slowly, that the cooling will suffice to produce homogenization by the diffusion of metals referred to above. The same result may be obtained by first heating the article with the solder to the melting point of the solder, then cooling the article without any special precaution, and then reheating to a temperature which is lower than that of the first heating. This is not only homogenizes the solder but causes a diffusion of the solder into the metal of the wire and the formation of mixed crystals from said metal and the solder. Still another way consists in heating the articles with the solder thereon at first to a temperature below the melting point of the solder and maintaining this relatively low temperature for a certain time and only then after the solder has had an opportunity to become somewhat homogenized at this lower temperature, increasing the temperature to the melting point. Finally, still another way consists in increasing the temperature very gradually and slowly to the melting point without keeping the temperature stationary at any stage. The heating required for melting the solder may be carried out in any suitable manner. A muffle oven may be used and if such oven is electrically heated and provided with a pyrometer the temperature may be increased and varied at will in accordance with the considerations explained above. The articles may also be supported on a plate of metal fabric or asbestos and then with such plate placed in the oven and heated to the melting point of the solder, whereupon they are removed from the oven and left to cool, the heat taken up by the plate insuring that the cooling action will be slow; or if desired a temperature below the melting point of the solder may be maintained for a time sufficient to effect the diffusion of the metals without risk of injuring the wire of the chain or other article. Chains are usually soldered in a hanging position by causing them to pass through several gas flames. If in this case the chains are passed through a tube containing the gas flame the period for heating the chain may be easily controlled by drawing off the gases in the direction of the travel of the chain in a tube of metal or refractory material; or if the chain is moved in a downward direction the temperature below the melting point may be maintained for a suitable time by means of a second flame of lower temperature.

Another method which may be employed for heating consists in causing the ring mesh fabric supported on a suitable carrier to travel beneath a row of flames which are directed downwardly. In this case the said support may be an endless band of wire mesh or a plate of refractory material or asbestos. Thus the supporting plate becomes strongly heated and after having passed through the zone of the flames gives up the heat again by radiation. In this case the slow cooling action may best be achieved by employing a reciprocating plate of firebrick and disposing in the rear of the flame and in the direction of the movement during soldering a stationary plate of refractory material as closely as possible above the fabric, the waste gases passing off between the stationary plate and the movable plate thereby continuously heating the upper plate. In the place of a reciprocating plate I may use a roller of firebrick or like material, adapted to be continuously rotated in the same direction, the flames being arranged above the highest point of said roller and the fabric moved thereover on one side and taken off from the other. In the rear of the flame zone and arranged concentrically with said roller is a plate of firebrick disposed above the fabric and as near as possible thereto.

For the simultaneous deposition of metals the following observations should be borne in mind:

For the soldering of German silver two metals may suffice, viz silver and cadmium or silver and zinc the curves of which may be brought sufficiently close together. Thus when using corresponding double salts, such as cyanide salts, cadmium may be deposited simultaneously with silver already at a tension of from 0.75 volts upward. The percentage of cadmium increases at the expense of the silver as the tension increases. But even an alloy of silver, copper, cadmium has the peculiarity of enabling the curve of the silver and coper to be displaced simultaneously i. e. that of the silver to a greater extent than that of the copper towards the base side in the direction of the curve of the cadmium, so that also in this case a deposit of the metals, in a proportion suitable for soldering, is obtained. The difficulties increase in the case of soldering chains or fabrics made of silver or gold, the conditions for the soldering alloys being here more exacting in so far as the solder must consist mainly of silver or gold and may only contain small quantities of flux which are of little account for the fineness and colour of the articles. The melting point of this soldering must, therefore, in general, be nearer the melting point of the fundamental metal than in the case of German silver. In this instance it has been found advantageous to employ two baths in succession, in each of which two metals are deposited so that a deposit of four different metals is produced, two of which become alloyed during deposition. The number of the different metals is reduced to three if one of the metals is common to both baths.

It is obvious that in the manipulation of the baths all known rules must be carefully observed in order to attain uniform and homogeneous continuous deposits; in particular attention must be paid to the arrangement and size of the anodes with respect to the immersed articles in order that the same current-density may prevail throughout on the articles. The carbonate of potassium formed from the cyanide of potassium must be removed and the degree of concentration of the baths must be carefully maintained.

The following are examples for soldering the most important articles in the fancy jewelry trade and which illustrate the application of the above mentioned principles so as to enable further applications to be devised therefrom.

*Example 1*

For soldering German silver a bath of silver and cadmium is used, the cadmium reducing the melting point of the resulting alloy. The bath contains per one litre liquid 20 grm. fine silver and 4 grm. cadmium. The silver is preferably used in the form of a salt in which the silver is contained as cyanide of silver-potassium mixed with a small quantity of conductive salts. The cadmium is used in the form of cyanide, cadmium potassium, 12 grs. of which are to be used per litre. The bath is worked at a normal temperature of about 20° C. with a tension of 1 volt and a current density of 0,2–0,3 amperes per square decimetre. The quantity of the articles to be suspended in the bath and the area of their surfaces should be so determined that a current density of 12 amperes is attained. In about 45–50 minutes a sufficient deposition is obtained containing 70–80% silver and 30–20% cadmium. The quantitive relation, however, does not exactly correspond to the proportion of the quantities of metal in the bath. As an anode, use is made with advantage of a silver-cadmium alloy in the proportion of about 70 : 30. In its place I may use anodes of fine silver, in which case the bath must be kept at the correct concentration by the addition of cadmium-salt.

In this case the use of the double salts i. e. cyanide-silver-potassium and cyanide-cadmium-potassium is the cause of the bringing closer together of the current-density potential-curves of the two-metals due to the formation of complex ions. Of course, the curve of the silver should be brought as close as possible to the curve of the cadmium, in order that as nearly as possible a minimum of the costly silver may be deposited, just sufficient for a good soldering.

The said curves are in this example also brought closer together by the so-called depolarization which has its cause in the formation of compounds of the silver with the cadmium of which at present $(Ag_2, Cd_3)$ $AgCd_3$ and $AgCd_4$ are known.

*Example 2*

Substantially the same results are obtained if the cadmium is replaced by zinc. The bath is also so composed that the same proportions by weight of the metals to be deposited and of the cyanide of potassium are obtained. The current-density remains likewise the same. Here also are formed complex ions: A favourable effect is attained also by the depolarization since the following compounds are known: $Ag_3Zn_2$, $AgZn$, $Ag_2Zn_3$ and $AgZn_5$

*Example 3*

If it is desirous to solder with silver-copper-cadmium the ratio of silver to copper to cadmium is with advantage about 65 : 5 : 30, excepting that the working conditions of the bath are to be altered so that potential may be 1.5–2 volts, the other condition set forth in Example 1 remains the same.

*Example 4*

When employing two or three baths, in each of which a metal-layer is deposited, any order of succession of the bath may be chosen. The silver is here suitably used also in the form mentioned in Example 1, whilst for the introduction of copper and zinc into the bath anodes of cast copper or cast zinc are used. The current-density of the silver bath is about 0,25, the tension of the zinc 1, and that of the cadmium 0,5–0,6 and the current tension for silver 1 volt, for zinc 1,5 volts, for cadmium 1,5 volts.

The temperature is normal room temperature, the time during which the articles are left in the bath is for silver alone about the same as for zinc and cadmium together.

Example 5

For the soldering of silver it has been found most favourable to use two baths, each of which is composed of two salts of the metals to be deposited, viz: a bath of copper and zinc, or copper and cadmium, and a bath of silver and cadmium or silver and zinc, which may be used in any order of succession. The silver-cadmium bath is treated in the same manner as in the previous examples. The copper-zinc bath is suitably worked with brass-anodes, containing copper and zinc in a proportion of about 55:45, at a tension of about 2,8 volts, a temperature of about 40–50° C. and a current-density of 0,25–0,35. In these examples using two baths the temperature is of importance for the displacement of the current-density potential curves and also the tension. These two values are not the same for both baths and a combination of both baths into one bath seems therefore scarcely possible.

Example 6

For silver-soldering the layers may also be deposited consecutively in one bath, in which case three metals are sufficient, namely silver, copper and zinc in succession, or copper, zinc and silver in succession, about the same conditions being used for the bath at normal temperature, as given in Example 4. In the case of zinc, it is advantageous to use a current-density 1, tension 1,5 volt; for copper a current-density 0,3–0,5, tension 2,8 volts, but at a temperature of 50–60° zinc may be replaced by cadmium. In order to facilitate the homogenization of the various layers in their fusion to a homogeneous alloy, the individual deposits may be kept thinner by producing three deposits of half the thickness twice in the order above given, that is to say, a total of six deposits.

Example 7

For depositing alloys for soldering chains or fabric made of gold or gold mesh, two baths are also used with advantage each consisting of two metals to be deposited. For 1 litre water 1 gr. of fine gold and 0.25 g. copper are taken, and the solution is preferably prepared as follows: 2 gr. gold chloride are dissolved in 1 litre water and 50 grs. cyanide-copper-potassium are dissolved in 1 litre of water. Both solutions are then mixed in proportion of 5 parts gold solution to 1 part copper solution. ½ gr. cyanide of potassium and about 4 grs. sodium sulphite as conductive salt is then added. Current-density about 0,2, tension 4–5 volts, temperature 50–60° C. The anode is preferably platinum, or a corresponding gold-copper alloy. The second bath is a silver-cadmium bath which is composed and worked as above. The duration of treatment in both cases is about 20–25 minutes.

Example 8

In the place of the gold-copper bath given in Example 7 use may be made of a gold-silver bath, the gold solution being prepared in the same manner. A silver salt solution is prepared with 11 grs. fine silver in 1 litre to which end 24, 3 grs. cyanide-silver-potassium may be used containing 11 grs. fine silver. The gold solution is mixed with this silver solution in proportion of 48 to 15. If a silvering salt of the character referred to in Example 1 is employed for the silver solution 27 grs. thereof are used, containing in addition to the cyanide-silver-potassium also an amount of conductive salt.

To the mixture prepared with the silvering salt are added, moreover, 0,5 grs. cyanide of potassium per 1 litre. The bath is worked at 50–60° C., with a current-density of 0,2 and tension of 5 volts. Then follows a treatment in a silver-cadmium bath, as described above. The duration for immersion is for both baths as above given.

Example 9

If for the purpose of gold soldering the individual metals are deposited consecutively in individual baths the working for silver and cadmium is the same as previously given. The current-density for the gold bath is 0.2.

What has been said above concerning the formation of complex ions applies also to Examples 8 and 9. The simultaneous deposition of gold and copper is likewise possible in consequence of a depolarization, since these metals too form compounds or solid solutions. In order to determine the amount of the deposits the duration of immersion in the baths is given in the above examples. This determination may, however, also be made in accordance with other known methods, for example, by observing the increase in weight resulting from the deposits formed on the articles immersed in the baths.

The articles produced in this way are ready for sale directly after the soldering and the usual finishing work. Articles of base metals may be further worked into plated articles by providing a coating of real silver or gold and subsequent burning in.

If on the other hand it is desired to remove the deposit from the whole article, in order to recover the metal, one can proceed as follows. The soldered fabric or the chain for this purpose is again immersed in an electrolytical bath, containing as a whole the same composition as the previously used bath, but in this case as anode, and I have found that the action of the electrolytical bath may be so determined that during the removal of the solder deposit from the wire the solder in the joint itself is not attacked to an injurious degree more especially when precaution has been taken to form a specially strong deposit in and near the joint.

If in this case the same bath has been used, which was employed for forming the deposit, the solder metal returns to the cathode thereby reinforcing the same, so that during a subsequent depositing operation in which case the cathode becomes again the anode, the latter is not attacked so strongly and, on account of the repeated use of the total metal, which is deposited upon the free length of the wire, a considerable economy is attained.

The method is especially advantageous if in carrying the same into effect the following is also observed.

By the electrolytical deposit of a very thin layer, the latter forms a compound on the contact surface with the wire, so that there is the danger that the wire metal itself will be attacked by this re-depositing. This danger can be avoided under certain conditions, if, for example, the tension during re-depositing is kept lower; for example, if, in the case of soldering German silver with a solder of silver and copper, only 0,8–1,0 volt is employed, whilst for the depositing a tension of 1–1.2 volts is used. Consequently in this case, the components of the solder alloy are again brought into solution, and in correct proportions of the individual parts of the solder alloy, and the said components are or only the rare metal is, thereby returned to the former anode.

If the re-depositing is carried out after heating the solder to melt it, the surface of the wire becomes smooth also. During the fusion the metal very often accumulates at individual points in thicker layers, but according to known laws, more of the metal is removed from these projections in an electrolytical bath than from the recesses, thereby having a smoothing effect.

On account of this smooth and economical removing of the deposit, one is not bound to make the same very thin, but one can deposit in such thickness that with increased surety a sufficient amount of solder is drawn into the joint.

In re-depositing in the case of soldering German silver, a diluted alkaline silver solution is employed and a sheet of German silver is best used as the cathode. The method is, for example also advantageously employed where the layers have not been produced by electrolytical depositing, but by other processes.

Now what I claim and desire to secure by Letters Patent is the following:

1. The process of soldering the joints of chains, ring mesh fabrics and like articles which consists in depositing on such articles, successively, superimposed layers of different metals which when melted together constitute a solder and then heating such articles under conditions which accomplish a melting of the metal layers constituting the solder and which keep the solder for a relatively considerable length of time at a temperature which is below the one required to fuse the solder so as to cause diffusion of the said metals into each other whereby a substantially homogeneous solder is produced.

2. The process of soldering the joints of chains, ring mesh fabrics and like articles which consists in depositing on such articles, successively, layers of different metals which together constitute a solder, then heating the articles to a temperature sufficient to melt the solder and thereupon cooling said articles so slowly that for a relatively considerable time the temperature, while below the melting point, will be sufficiently high to permit the homogenization of the solder by diffusion of its constituents.

3. The process such as set forth in claim 2, in which the articles are constituted of base metal and in which the depositing is conducted by electrodepositing a layer of solder containing a precious metal on the surface of the said base metal article.

4. The process such as set forth in claim 2, in which the depositing of the solder is conducted by electro-depositing simultaneously a plurality of metals constituting one portion of the solder and subsequently electro-depositing simultaneously a plurality of metals constituting the other portion of the solder.

In testimony, that I claim the foregoing as my invention, I have signed my name, this twentieth day of August, 1924.

EUGEN THOMA.